Aug. 19, 1941.　　　W. V. MOUNTS　　　2,252,896

CUTLERY

Filed May 10, 1939　　　2 Sheets-Sheet 1

INVENTOR
WILFRED V. MOUNTS
BY
ATTORNEYS

Aug. 19, 1941.  W. V. MOUNTS  2,252,896
CUTLERY
Filed May 10, 1939  2 Sheets-Sheet 2
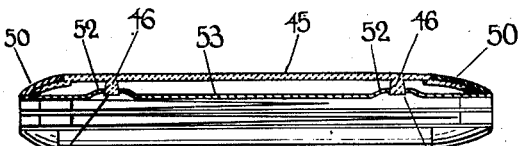
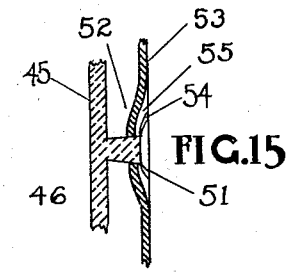
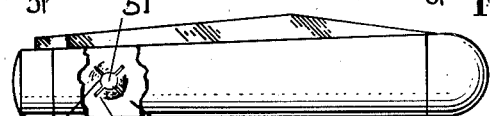
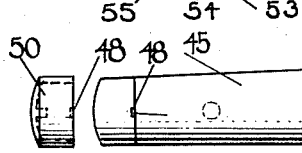
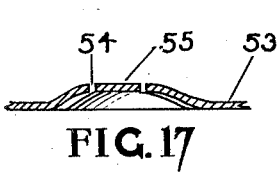
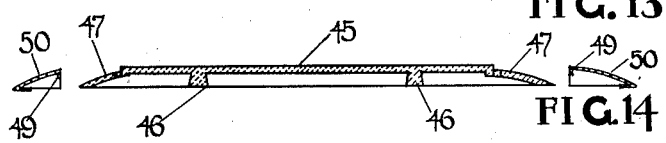
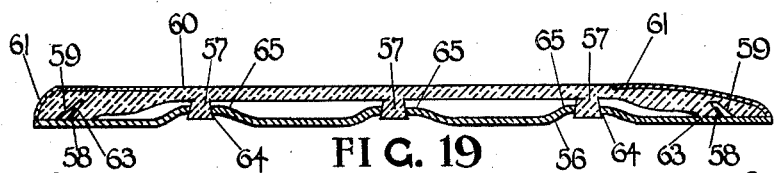
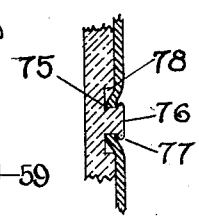
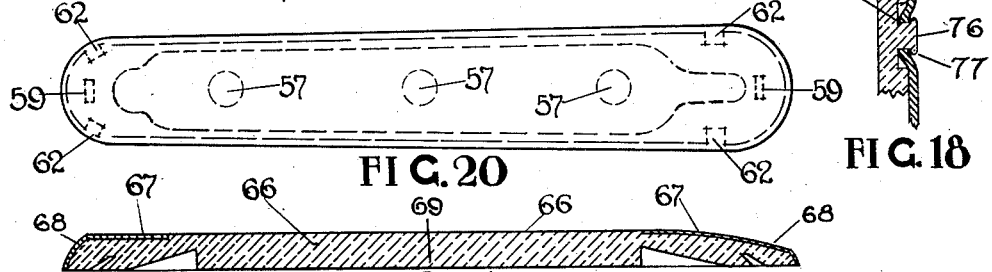
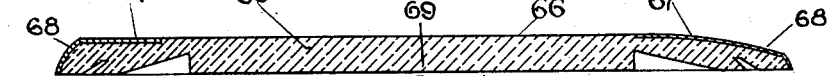
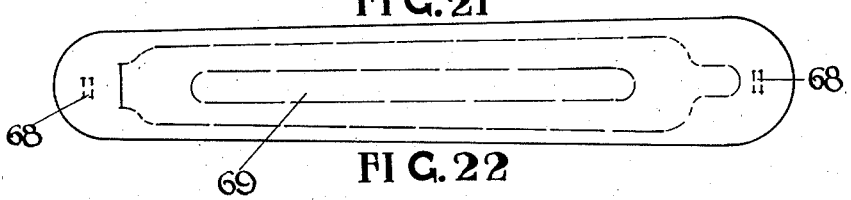
INVENTOR
WILFRED V. MOUNTS
BY
ATTORNEYS Patented Aug. 19, 1941

2,252,896

UNITED STATES PATENT OFFICE 2,252,896

CUTLERY

Wilfred V. Mounts, Stratford, Conn., assignor to Remington Arms Company, Inc., a corporation of Delaware Application May 10, 1939, Serial No. 272,778

16 Claims. (Cl. 30—164)

The invention relates to a pocket knife having plastic handles and has for one of its objects the provision of a simplified construction of the plastic handles, bolsters and cover plates for a pocket knife providing for easy assembly and construction.

The other objects and features will be apparent from the specification and disclosure herewith.

In the drawings:

Fig. 11 is a plan view of an assembled knife having another type of cover plate, one handle being in section.

Fig. 12 is a side view of the knife of Fig. 11 with a portion of the handle broken away to show the aperture in the scale of the form shown in Figs. 15 to 17 inclusive.

Fig. 13 is an exploded plan view of the cover plate with the end bolster pieces separated therefrom.

Fig. 14 is a sectional view of the cover plate and bolster of Fig. 13.

Fig. 15 is an enlarged fractional sectional view showing the relationship of the cover plate to the scale of the knife when assembled.

Figs. 16 and 17 are details of the form of the aperture in the scale of the knife shown in Figs. 11, 12 and 15.

Fig. 18 shows a modification of the means of fastening the handle to the scale.

Fig. 19 is a sectional side view of still another form of cover plate similar to the embodiment shown in Fig. 11, a portion of the scale of the knife being shown.

Fig. 20 is a plan view of the cover plate of Fig. 19.

Fig. 21 is a sectional view of still another modification of the cover plate of Fig. 11.

Fig. 22 is a plan view of the cover plate shown in Fig. 21.

In general, the invention involves the fastening of a plastic handle to an element of a knife by means of a projection on the plastic handle which passes through an aperture in an element of the knife, the element being a separate bolster cover plate or the scale of the knife itself.

Figure 1:
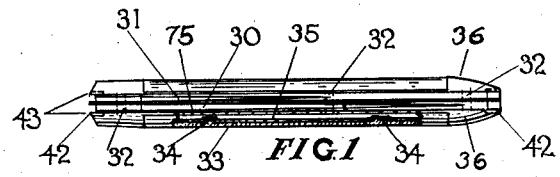
Fig. 1 is a plan view of one embodiment of the assembled knife, a portion of one handle being in section.
Figure 2:
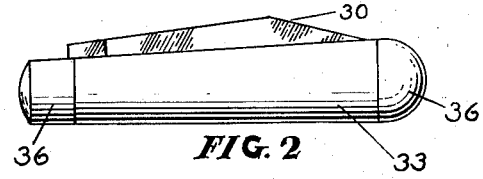
Fig. 2 is a side view of the assembled knife.
Figure 3:
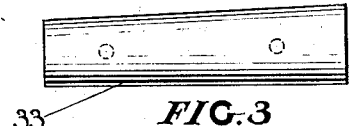
Fig. 3 is a plan view of one of the plastic handles.
Figure 4:
Fig. 4 is a sectional view of the handle shown in Fig. 3.

Referring specifically to Fig. 1, there is found the conventional pocket knife, having, for example, blades 30 and 31, it being understood that the arrangement of these blades may take any of the usual forms and that there may be one or any number of blades, said blades being held in the knife by the usual rivets 32, the number and location of which also depend upon the type and construction of the knife. A plastic handle 33 may be composed of any of the usual or the desirable types of plastics or similar materials, for example, cellulose acetate, the plastic being chosen in accordance with the desired final appearance of the knife. The plastic handle 33 has projections 34 extending inwardly thereof which may have, if desired, an enlarged portion at the free end of the projection.

Figure 5:
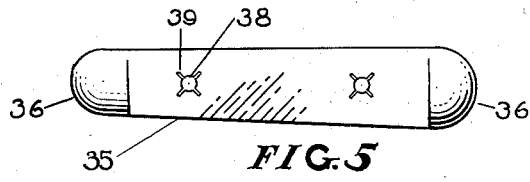
Fig. 5 is a plan view of a bolster plate used in the embodiment shown in Fig. 1.
Figure 6:
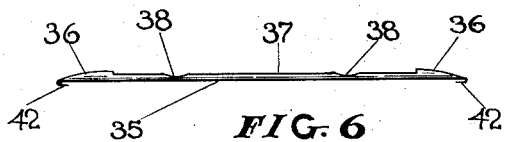
Fig. 6 is a sectional view of the bolster plate of Fig. 5.
Figure 7:
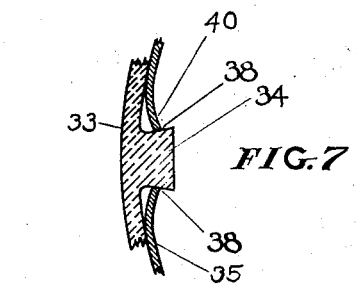
Fig. 7 is an enlarged fractional view showing the relationship between the plastic handle and metal bolster plate of Figs. 1 to 6 inclusive.
Figure 8:
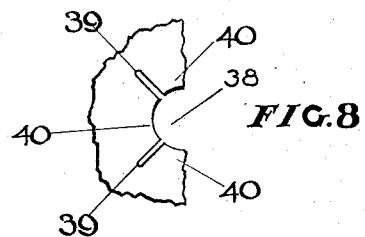
Fig. 8 is an enlarged plan view of a portion of one form of aperture in the metal bolster plate.
Figure 9:
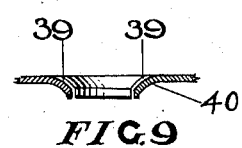
Fig. 9 is a fractional sectional view of Fig. 8.

Figs. 5 and 6 show a bolster plate 35 which can be of metal or any other desirable material. Said bolster plate may have raised ends 36 and a recessed portion 37 therebetween adapted to receive the plastic handle 33, the bolster giving the appearance of the usual pocket knife when the plastic handle is in place thereon. At 38 there are apertures which have had the metal for an area surrounding the same indented or pressed inwardly for the embodiment about to be described, said apertures being of similar configuration to the projections 34. The apertures, in this form, have slots 39 cut into the edges thereof, as shown in Figs. 8 and 9, the tongues 40 between the slots serving as an engaging means for the projections 34, the spring tongues engaging and gripping the projection. Any number of slots may be cut therein. In order to assemble the knife, suitable means may be used to expand the tongues 40, thereby enlarging the aperture 38 so that the projection 34 will pass therethrough. Upon release of tongues 40, engagement will be had with the projection 34 (Fig. 7). As stated, the free ends of the projections 34 may be enlarged to assist in the engagement. The metal bolster plate 35 may then be attached in any well-known manner to the knife, for example, the projections 42 (Figs. 1 and 6) fitted into suitable recesses 43 in the scale 75 of the knife.

Figure 10:
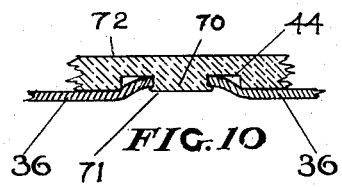
Fig. 10 shows a modification of the fastening means of the handle to the metal bolster plate.

The plastic handle may also be assembled on the bolster plate by the use of apertures without the slots in the margin of the aperture. Referring to Fig. 10, the material surrounding the aperture in the bolster plate 36 is pushed outwardly towards a plastic handle 72. The protruding portion of projection 70 may be suitably enlarged (as at 71) after it has been passed through the aperture by means of a solvent for the plastic used in the handle. This solvent will cause the protruding portion to be enlarged and secure the handle to the plate. It is clear that the solvent may also have an adhesive or plastic mixed therewith to assist in the bond, and when the term is so used herein it includes such a mixture. The protruding projection 71 may also be enlarged by means of heat applied thereto, or by means of pressure to upset the end thereof. The plastic handle, when the portion of the plate surrounding the aperture is raised toward the handle, may have a suitable recess 44 to receive the raised projection, the remainder of the interior surface of the handle contacting the bolster plate as can be seen in Fig. 10, for example.

A second embodiment of the invention is found in Figs. 11 to 17. In this form, a plastic cover takes the place of the bolster plate of Figs. 1 to 6, and the bolster pieces at the end are molded or attached in any suitable manner to the plastic cover plate, the plastic cover plate itself serving as the handle. At Figs. 13 and 14 a plastic cover plate is shown at 45, having projections 46 extending inwardly and having recessed portions 47 with indentations or apertures 48 for receiving the engaging members 49 of the end bolster pieces 50. The scale of the knife itself in this modification has apertures 51 pierced therein, corresponding to the projections 46. These apertures are in a portion of the metal that has been pressed outwardly from the center of the knife. In Fig. 11, the cover plate 45 is shown in its assembled relation with the end bolster pieces 50 attached thereto, the projections 46 entering apertures 51 in the raised portions 52 of the knife scale 53, the knife shown, as in Fig. 1, being of any conventional type. In one embodiment of this form, similar to that shown in Figs. 7, 8 and 9, the aperture 51 has slots 54 cut into the margins thereof, leaving tongues 55, which serve to engage the projection 46, the assembled relation of the cover plate 45 to scale 53 being shown enlarged in Fig. 15. The apertures 51 may also be made without the slots and of the same configuration as the projections, as can be seen in Fig. 18, aperture 75 receiving projection 76, the protruding portion of projection 76 being enlarged, as at 77, by a solvent, heat or pressure, in a manner similar to that disclosed in Fig. 10.

In the assembly of this embodiment, wherein the cover plate and handle are fastened directly to the scale, the plastic cover plate 45, which has previously had the bolster pieces 50 placed thereon, is put in position on the knife and pressed inwardly. In the form shown in Figs. 15 to 17, the openings of the apertures 51 are separated as described for the form shown in Figs. 7 to 9, allowing the entrance of projection 46 therein. The free ends of projections 46 may be enlarged, similar to projections 34, to assist in the engagement. Where the apertures are of the type shown in Fig. 18, without the slots in the margin thereof, after the knife has been assembled with the projections 76 entering apertures 75, a heating means is caused to contact the protruding portion 76 within the knife, causing an enlargement of the projection 76, as at 77, or a solvent is placed thereon as previously described for the embodiment shown in Figs. 1 to 6 inclusive. As described for Fig. 10, when the plastic cover plate contacts the scale, a recess 78 is provided in the cover plate to receive the raised portion surrounding the aperture 75.

In Figs. 19 and 20, there is shown a further modification of the embodiment disclosed in Figs. 11 to 14. A portion of the scale is shown at 56 having apertures into which projections 57 pass. At either end of the scale 56 may be located prongs 58 which will fit into the apertures 59 in the cover plate 60. The end bolster pieces 61 may be molded, if desired, directly to the cover plate, such as shown in Figs. 19 and 20, being held in place by the projections 62 engaging the cover plate. In the assembly of this form, the plastic cover plate may be flexed slightly in the center away from the scale 56, such that projections 58 will fit into the apertures 59 of the cover plate. Then, as the cover plate straightens out, projections 58 will engage the surface 63 of the cover plate, and due to the angular relation thereof, serve to pull the cover plate into engagement with the scale. At the same time, the projections 57 will enter the apertures 64 in the raised portions 65 of the scale, and can then be fastened in any of the manners previously described.

In Figs. 21 and 22 there is disclosed still another modification which is similar to that of Figs. 19 and 20, in which 66 is a plastic cover plate with suitable end bolster pieces 67 and apertures 68, engageable with projections similar to 58 of the scale 56 of Fig. 19. The distinguishing feature in this modification is that the projection 69 passing through the scale is a continuous one adaptable to be fitted into a corresponding slot in the scale 56, which can then be fastened thereto by enlargement of the free end of projection or lug 69, by heat, pressure, or a solvent in the manner previously described. In addition to the holding means provided by the projections as described, an adhesive may also be used, for example, between the handle 33 (Fig. 3) and the cover plate 35 (Figs. 5 and 6) to further fasten the handle to the knife, although such is not necessary with the invention disclosed. The projection of the form shown in Figs. 21 and 22 can also be applied to the embodiments shown in Figs. 1 to 20 inclusive.

In a knife with an aperture having slots in the margin (Figs. 7 to 9 inclusive or Figs. 15 to 17 inclusive), it is to be understood that in place of a plastic, any suitable material, such as bone, horn, mother of pearl or the like may be used, the spring tongues 40 or 55 serving to hold the handle and knife element in engaging relationship.

The invention is believed to provide a simple and easy means to construct a pocket knife and is not to be limited to the details shown herein, but is to be construed as covering all equivalent devices falling within the scope of the appended claims.

What is claimed is:

1. In a handle for a pocket knife, the combination comprising: a substantially planar element of the knife having a portion thereof displaced from the plane of the element, said portion having an aperture therein; and a plastic handle having an integral projection fitting into and passing through said aperture, whereby the handle and element are fastened together.

2. In a handle for a pocket knife, the combination comprising: a plastic handle having an integral projection; an element having a portion thereof displaced from the plane of the element, said portion having therein an aperture and slots intersecting the margin of said aperture, said aperture conforming to and being adapted to receive said projection, whereby the handle and element are fastened together.

3. In a pocket knife comprising a handle and a knife element, means for securing said handle to said element comprising a projection on said handle, there being an aperture in said element adapted to receive said projection, the margin of said aperture being serrated to form resilient tongues adapted for gripping engagement with said projection.

4. In a pocket knife comprising a frame plate and a plastic handle: means for securing said plastic handle to said frame plate, comprising a portion of said plate struck from the plane thereof, there being an aperture in said portion, the margin of said aperture being serrated to form resilient tongues; and a projection on said plastic handle adapted to be received in said aperture and held therein by the resilience of said tongues.

5. In a handle for a knife, the combination comprising: a substantially planar element having a portion thereof displaced from the plane of the element, said portion having an aperture therein, a plastic handle having an integral projection fitting in said aperture and a portion thereof passing through the same, said portion being enlarged after assembly to fasten the element and handle together.

6. In a pocket knife, the combination comprising: a cover plate having a portion thereof displaced from the surface of the cover plate, said portion having an aperture therein, the ends of the cover plate serving as the end bolsters for the knife; a plastic handle having a projection fitting into and passing through the aperture, the portion of the projection protruding therethrough being enlarged, thereby fastening together the cover plate and plastic handle.

7. In a pocket knife, the combination comprising: a cover plate having a plurality of portions displaced from the plane thereof, said portions having apertures therein; the cover plate having bolsters at the ends thereof; a plastic handle for engaging with the cover plate and fitting between the bolsters, said plastic handle having a plurality of inwardly extending projections fitting into and passing through the apertures, the portions of the projection protruding therethrough being enlarged whereby the cover plate and plastic handle are joined together.

8. In a pocket knife having a scale, said scale having a displaced portion with an aperture therein, the combination comprising: a plastic cover plate; bolsters fitting on the ends of the cover plate; and a projection extending inwardly from the cover plate, said projection being adapted to engage the aperture of the knife scale for fastening the cover plate to the knife.

9. In a pocket knife, the combination comprising: a plastic cover plate having an inwardly extending projection, said knife having an outwardly extending portion, said portion having therein an aperture and slots intersecting the margin of said aperture, said aperture conforming to and being adapted to receive said projection, whereby the cover plate is fastened to the knife.

10. In a pocket knife having a scale, the combination comprising: a plastic cover plate having an inwardly extending projection; bolsters fitting on the ends of the cover plate, said scale having an outwardly extending portion with an aperture therein to receive the cover plate projection, said scale having projections at each end sloping inwardly, said plastic cover plate having apertures near each end sloping at substantially the same angle as the projections on the scale to receive the same whereby the projections engage in said apertures to fasten the cover plate to the knife.

11. In a pocket knife assembly, the combination comprising: a plastic cover plate having a projection thereon extending inwardly, the knife having an outwardly extending portion with an aperture therein through which the projection passes, an adhesive between the cover plate and the knife, the portion of the projection protruding through the aperture being enlarged.

12. In a pocket knife assembly, the combination comprising: a plastic cover plate having a recess with a projection formed therein, the knife having an aperture in the side thereof, the material surrounding the aperture being pressed outwardly so that the extending portion fits into the recess in the cover plate, the projection on the cover plate passing and protruding through the aperture and secured therein by the enlargement of the protruding portion by heat.

13. In the assembly of a pocket knife comprising a plastic handle and a rigid frame, the method of securing the handle to the frame comprising the steps of passing a projection of the plastic handle through an aperture in the frame, and then securing the handle to the knife by applying a solvent for the plastic used to the projection protruding through the aperture, thereby enlarging said projection.

14. In the assembly of the plastic handle to a pocket knife, the method comprising the steps of passing a projection on the plastic handle through an aperture in the knife, and then securing the handle to the knife by applying to a portion of said projection extending through said aperture a solvent containing a similar plastic in solution.

15. As an article of manufacture, a moulded plastic handle for a pocket knife having a recess in the underside thereof and a projection extending therefrom within the recess.

16. As an article of manufacture, a moulded plastic handle for a pocket knife having a recess in the underside thereof and a projection extending therefrom within the recess, and having recesses extending inwardly from the underside at each end thereof.

WILFRED V. MOUNTS.